(12) United States Patent
Ouellette

(10) Patent No.: US 6,527,282 B2
(45) Date of Patent: Mar. 4, 2003

(54) CONVERTIBLE SKI-SUPPORTED VEHICLE

(76) Inventor: Michael J. Ouellette, P.O. Box 34, Caribou, ME (US) 04736

( * ) Notice: Subject to any disclaimer, the term of this patent is extended or adjusted under 35 U.S.C. 154(b) by 45 days.

(21) Appl. No.: 09/818,058

(22) Filed: Mar. 26, 2001

(65) Prior Publication Data

US 2002/0135141 A1 Sep. 26, 2002

(51) Int. Cl.[7] .............................................. B62M 27/00
(52) U.S. Cl. ................. 280/7.14; 280/7.12; 280/43.24; 280/8; 280/9; 280/43.14; 280/28
(58) Field of Search ...................... 280/7.14, 28, 43.23, 280/43.24, 8, 9, 10, 11, 12, 43.14, 43.22, 767, 30, 7.12

(56) References Cited

U.S. PATENT DOCUMENTS

| | | | | |
|---|---|---|---|---|
| 608,904 A | * | 8/1898 | Perkins | 280/11 |
| 1,227,882 A | * | 5/1917 | Bute | 280/11 |
| 1,238,333 A | * | 8/1917 | Ratner | 280/11 |
| 1,308,937 A | * | 6/1919 | Crane | 280/11 |
| 3,218,006 A | * | 11/1965 | Albright | 244/50 |
| 3,477,734 A | * | 11/1969 | Albertson | 280/11 |
| 3,552,515 A | * | 1/1970 | Tomita | 180/184 |
| 3,570,617 A | * | 3/1971 | O'Day | 180/184 |
| 3,593,814 A | | 7/1971 | Bauler | |
| 3,664,446 A | | 5/1972 | Burtis et al. | |
| 3,664,447 A | | 5/1972 | Kane | |
| 3,696,877 A | * | 10/1972 | Dessureault | 180/184 |
| 3,709,512 A | * | 1/1973 | Albertson | 180/182 |
| 3,726,354 A | * | 4/1973 | LaPlante | 280/21.1 |
| 3,774,706 A | | 11/1973 | Kiekhaefer | |
| 3,777,829 A | * | 12/1973 | Rogers | 180/184 |
| 3,942,812 A | * | 3/1976 | Kozlow | 280/28 |
| 4,082,155 A | | 4/1978 | McCartney | |
| 4,195,702 A | | 4/1980 | Denis | |
| 4,204,582 A | | 5/1980 | van Soest | |
| 4,288,087 A | | 9/1981 | Morrison | |
| 4,390,151 A | * | 6/1983 | Schneider | 180/183 |
| 5,439,237 A | * | 8/1995 | Kutchie | 280/11 |
| 5,564,517 A | | 10/1996 | Levasseur | |
| 5,829,545 A | | 11/1998 | Yamamoto et al. | |
| 6,408,962 B1 | * | 6/2002 | Ryckman | 180/9.22 |

FOREIGN PATENT DOCUMENTS

| | | |
|---|---|---|
| JP | 03038484 | 2/1991 |
| SU | 71226 | 10/1929 |

* cited by examiner

Primary Examiner—Brian L. Johnson
Assistant Examiner—J. Allene Shriver
(74) Attorney, Agent, or Firm—Patricia M. Mathers; Thomas L. Bohan

(57) ABSTRACT

Wheel unit to be semi-permanently mounted on the ski of a snowmobile. Wheels are readily deployable or retractable as conditions require. The wheel unit allows the snowmobile to be driven over gravel, dirt, and hardtop surfaces, without losing its ability to be steered with the handlebars.

17 Claims, 3 Drawing Sheets

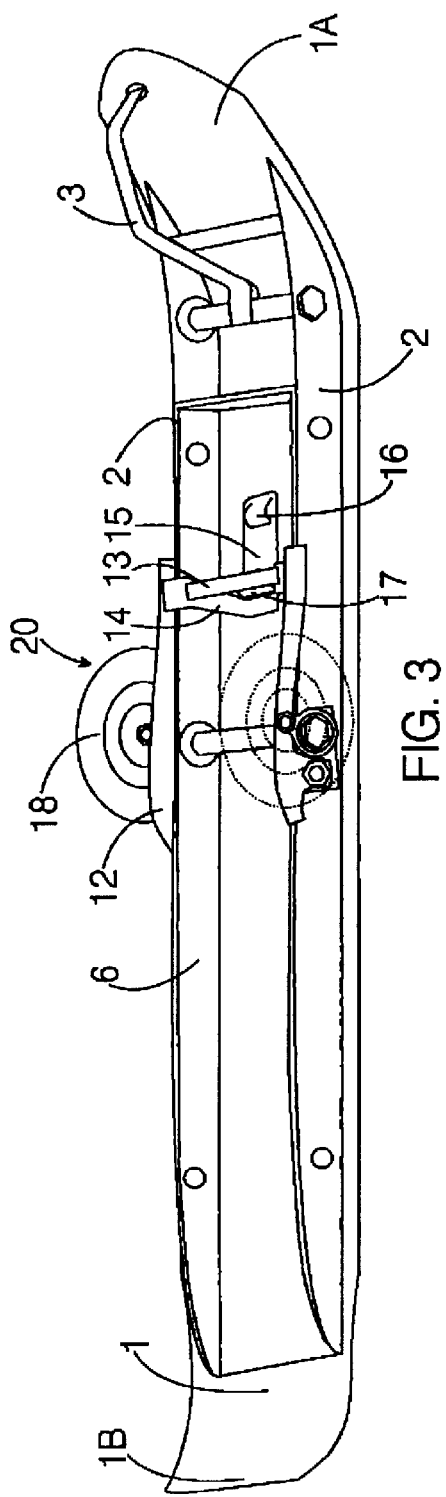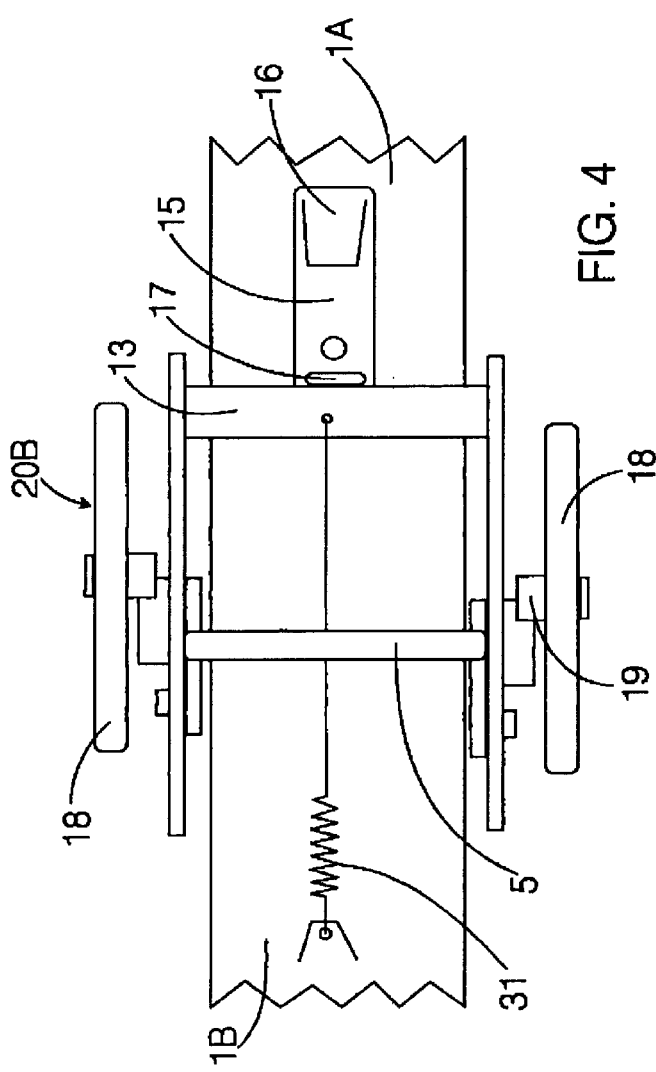

CONVERTIBLE SKI-SUPPORTED VEHICLE

BACKGROUND INFORMATION

1. Field of the Invention

The invention relates to the field of ski-supported vehicles. More particularly, the invention relates to snowmobiles equipped with wheels that will allow the snowmobile to travel readily over surfaces not covered with snow or ice.

2. Description of the Prior Art

Snowmobiles are vehicles that are constructed to travel across snow and ice. As is generally known, the snowmobile is driven by an endless drive track arranged at the rear end of the underside of the snowmobile. The front end of the snowmobile is supported and rides along two skis, which glide across the surface of the snow or ice. The skis typically have a carbide runner that runs along a portion of the bottom surface of the ski, to help keep the snowmobile traveling along a smooth track.

A disadvantage of snowmobiles is that the skis don't readily glide across gravel, hardtop, or other non-snow surfaces. This makes it difficult, if not impossible, to steer a snowmobile because the skis do not respond properly to the steering operations initiated at the handlebars. Quite often, the snowmobile needs to be dragged or pushed in driveways and across roadways, etc. Furthermore, when a snowmobile is driven or dragged across a non-snow surface, the carbide runners on the skis are subject to excessive wear and must be replaced more frequently, depending on how often a snowmobile travels across a non-snow surface. This inability to steer snowmobiles on surfaces other than snow and ice makes it difficult for people to maneuver their snowmobiles across roadways, driveways, onto ferries, etc.

In recent years, the sport of snowmobiling has changed evolved from one of traveling relatively short distances over trails close to home to one of weekend-long or longer cross-country trips. Previously, for example, a snowmobile operator would fill the gasoline tank of the snowmobile in his or her backyard, transport the snowmobile to a trail site or depart directly from the backyard for an afternoon or day of travel over snowmobile club trails, and then return home. Nowadays, people are traveling great distances across country on snowmobiles that involve two-or three-day tours or even such mammoth tours as from Alaska to Maine.

This development of the sport of snowmobiling into extended trips means that snowmobiles must now be refilled with gasoline and maintained while they are out traveling across open country. Thus, where in the past the tank on the snowmobile was filled at home or at the point of departure before a daylong excursion, snowmobiles now need to be refilled while out traveling. This means that the snowmobile must be driven to a service station, typically by traveling some distance along a road surface other than snow or ice. Also, now that such lengthy trips are being undertaken with snowmobiles, the presence of snow along the entire route is not guaranteed, and consequently, snowmobiles are being required more and more frequently to travel some distance across surfaces other than snow or ice. Before, when a snowmobile needed to be dragged or pushed only a short distance across a roadway or driveway, or up a ramp onto a ferry, it was possible for a person to do it alone or with the assistance of a traveling companion. Now, however, with the need to travel several miles along a roadway to get to a filling station, the inability to steer a snowmobile has become a major obstacle in the logistics and the enjoyment of the sport.

Efforts to make snowmobiles mobile on gravel or other surfaces have been undertaken over the years. Prior art includes conversion kits to replace the skis with wheels. These conversion kits were intended to replace the skis on a semi-permanent basis, that is, to convert a snowmobile into a wheeled vehicle for an extended period of time. Such conversion kits typically require that the ski be removed in order to mount the wheels, or, if the ski does remain attached to the vehicle, a longer kingpin must be used to mount the wheels. Thus, each time the wheels are mounted or removed, the kingpin must be replaced with the longer or shorter one, respectively. Both methods of converting the snowmobile to a wheeled vehicle involve a fair amount of work. Thus, such conversion kits are not generally an acceptable solution to the problem of having to change in relatively quick succession back and forth between a vehicle that rides on skis and one that rides on wheels, as happens when traveling over gravel or hardtop or other surface other than snow or ice to fill the gas tank or to load onto a ferry.

What is needed, therefore, is a means for quickly converting a vehicle from one gliding on skis to one rolling on wheels and back. What is further needed is such a means that will not impair the steerability of the vehicle. What is yet further needed is such a means that can be implemented easily, without requiring great physical strength, and without requiring the use of tools.

SUMMARY OF THE INVENTION

An object of the present invention is to provide a combination ski-wheel unit that will allow one to convert a ski-supported vehicle quickly and easily to a wheeled vehicle and back to a ski-supported vehicle, without requiring the use of tools. Another object of the present invention is to provide such a unit that will maintain the steerability of the vehicle, whether on skis or on wheels. A further object is to provide such a unit that, once installed, can be easily deployed without requiring great physical strength. Still another object is to provide a wheel kit with deployable wheels that can be retrofitted onto any conventional snowmobile ski.

The objects are achieved by providing a road wheel unit that is semi-permanently installed on the ski of a conventional snowmobile so as to provide a set of wheels that are easily deployable or retractable as the conditions require. The road wheel unit includes a kingpin to replace the conventional kingpin to which the ski spindle attaches, a wheel mounting bracket mounted on each side of the kingpin, and a movable frame that is mounted onto the wheel mounting bracket, outside the ski. In a retracted position, i.e. the standard snowmobile mode of operation, the wheels are carried alongside the ski, raised above the gliding surface of the ski. In a deployed position, the wheels are lowered, so that the weight of the machine is supported by the wheels. The wheels in this deployed position hold the ski above the rolling surface of the wheels, and allow the snowmobile to ride on wheels and the conventional endless track at the rear end. In the latter mode, the snowmobile remains readily steerable with the handlebars and the carbide runners on the ski surfaces are not subject to excessive wear. If desired, the wheels can simply be unscrewed from the wheel mounting bracket, leaving the frame, wheel mounting bracket and modified kingpin permanently on the vehicle.

In one embodiment of the wheel unit, the movable frame has a crossbar and a yoke that depends from the crossbar into the inner contour of the ski. The movable frame can be locked in two positions, a retracted position and a deployed position. To deploy the wheel unit, a person lifts the ski by the handle that is typically provided at the front end of the ski, grabs hold of the crossbar and slightly lifts and slides it forward toward the front end of the ski until the yoke latches with a latching mechanism provided on the inner bottom surface of the ski. The two wheels, one on each side of the ski, are thereby lowered and secured in the deployed position. The snowmobile can now be driven across gravel and hardtop surfaces without losing its ability to be steered with the handlebars.

To retract the wheels, the procedure is reversed. A person lifts the ski until the weight of the snowmobile is off the wheels, grabs the crossbar and slides it toward the rear end of the ski until it is secured in a retracted position. The wheels are now secured in a raised or retracted position in which the lowest point of the wheels is above the gliding surface of the ski, allowing the snowmobile to glide fully on the skis.

It is within the scope of this invention to provide a wheel unit for ski-mounted vehicles that can be actuated in a variety of ways. What was described above is a simple mechanical actuation. It is, of course, possible to provide any number of automated or power-assisted means of deploying and retracting the wheels. In one embodiment, the movable frame is spring-biased toward the retracted position, so that, when the snowmobile weight is lifted from the ski, the wheels will automatically spring back to a retracted position. Other means for actuating the deployment and retraction of the wheel unit according to the invention include such means as a pivot arm or linkage driven by an electric motor, an electro-magnetic means in which magnets are selectively magnetized to draw the frame to a deployed or retracted position, or hydraulic or pneumatic means. In a Preferred Embodiment, a small electric motor is placed within the inner contour of the ski and wired to a thumb switch on the handlebar of the snowmobile. The motor drives a shaft that is connected to an arm that is pivotably linked to the frame. When the shaft extends, the frame is pushed to a deployed position, thereby lowering the wheels to an operable level, and when the shaft retracts, it pulls the frame to a retracted position, thereby lifting the wheels above the level of the gliding surface of the ski. An indicator, for example, a warning light is arranged on the dashboard or on the handlebar, to alert the operator when the wheel unit is deployed.

Although it is desirable that snowmobiles be sold equipped with wheel units according to the present invention, a wheel kit is provided to retrofit any of the conventional snowmobiles already available. The ski itself need not be modified. The original kingpin is replaced with the modified kingpin according to the invention, to which the wheel unit is attached. Depending on the type of wheel unit actuation means chosen, manual, electric, or other, an actuation means, a switch and/or an indicator light may also be retrofitted on the snowmobile.

With the wheel unit of the present invention, the wheels are semi-permanently mounted on the ski. Depending on the particular travel conditions, the wheels can be deployed, so that the snowmobile becomes a wheeled vehicle, or retracted, so that the wheels are carried along side the ski in a raised position, above the gliding surface of the ski.

BRIEF DESCRIPTION OF THE DRAWINGS

FIG. 3 is a perspective view of a ski according to the invention, showing the wheel unit in a retracted position, with the movable frame and a latching mechanism.

FIG. 4 shows a spring-biased movable frame according to the invention.

DETAILED DESCRIPTION OF EMBODIMENTS OF THE INVENTION

Figure 1:
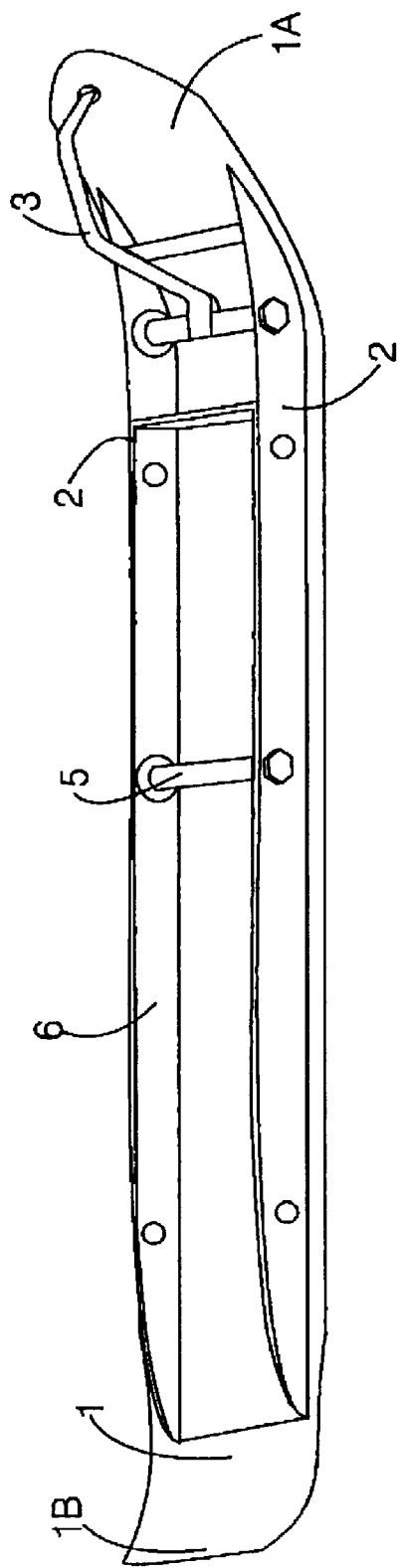
FIG. 1 shows a perspective view of a conventional snowmobile ski (prior art).

FIG. 1 shows a conventional snowmobile ski comprising a ski 1 having ski sides 2, a lifting handle 3 disposed at a front end 1A of the ski, and a reinforcing liner 6. A kingpin 5 is mounted in the ski 1. A spindle (not shown) mounts on the kingpin 5 to attach the ski 1 to the snowmobile.

Figure 2:
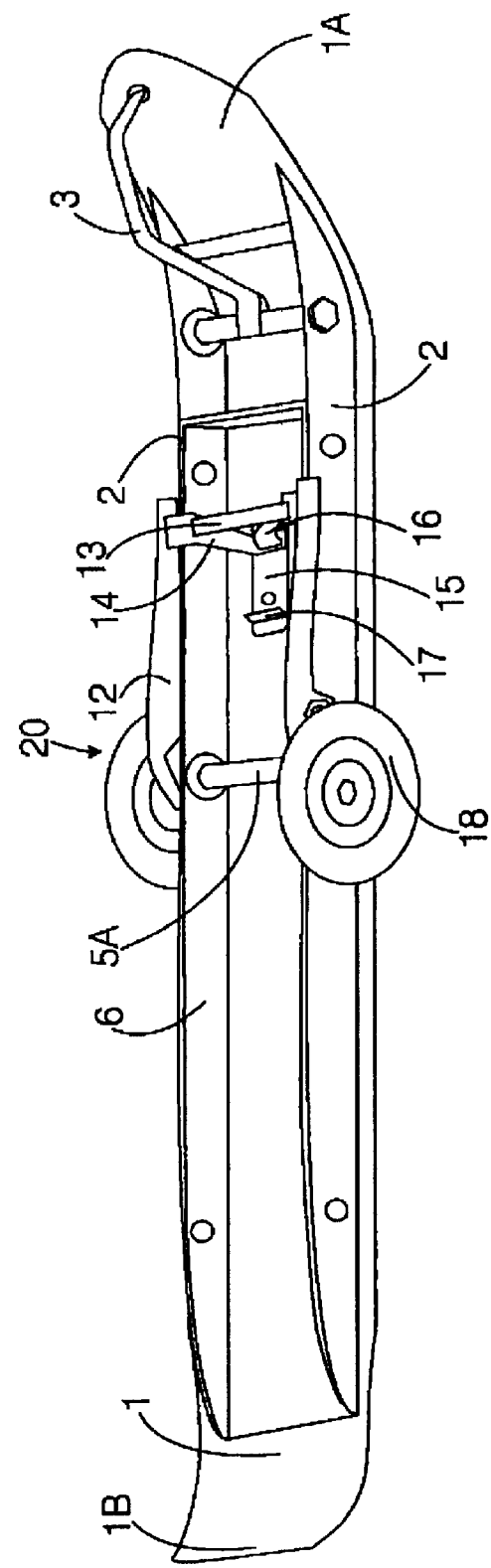
FIG. 2 is a perspective view of a ski according to the invention, showing the wheel unit in a deployed position, with the movable frame and a latching mechanism.

FIG. 2 shows a first embodiment of a wheel unit 20 according to the invention that has been assembled on the ski 1. As shown in this FIG. 2, the wheel unit 20 is in a deployed position. The wheel unit 20 comprises a movable frame 12 with a cross-bar 13, a yoke 14, a modified kingpin 5A, a wheel mounting bracket 21, and a pair of wheels 18. Mounted in the bottom of the ski 1 is a latching means 15. In this first embodiment, the latching means 15 comprises a simple latch 16 and a stop plate 17. The movable frame 12 has been moved to a deploy position and the yoke 14 is held by the latch 16.

FIG. 3 shows the first embodiment of the ski 1 with the wheel unit 20 in a retracted position. As can be seen, the movable frame 12 has been shifted toward a rear end 1B of the ski 1 and the yoke 14 is held in position by the stop plate 17. This embodiment is a basic mechanical embodiment of the wheel unit 20 that can be deployed manually by a snowmobile operator. To deploy the wheel unit 20 from the retracted position shown in FIG. 3, the snowmobile operator merely lifts up on the ski handle 3 with one hand, grabs the crossbar 13 with the other hand and pushes it toward a front end 1A of the ski 1 until the yoke 14 catches under the latch 16 on the latching means 15.

Figure 5:
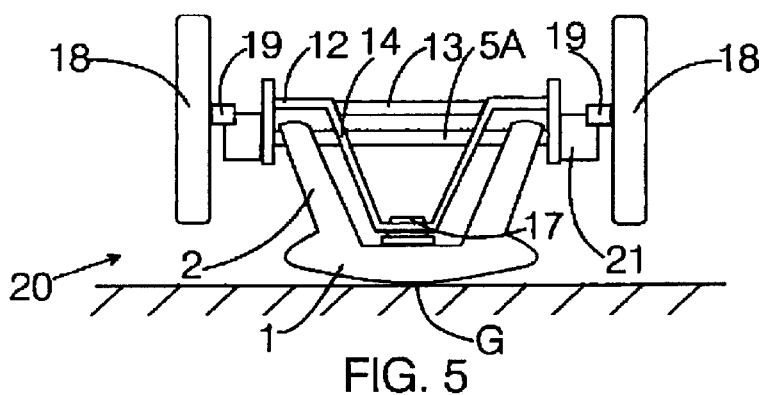
FIG. 5 shows a cross-section of the wheel unit according to the invention, showing the movable frame within the ski profile and a motor.

FIG. 5 shows a cross-section of the ski 1 with the wheel unit 20, looking from the rear toward the front of the ski 1. The movable frame 12 is mounted on the ends of a modified kingpin 5A that extend to the outer side of the sides 2 of the ski 1. The kingpin 5A is longer than the conventional kingpin 5 to allow the movable frame 12 to be mounted on each end of the kingpin 5A on the outside of each of the ski sides 2. A wheel-mounting bracket 21 is attached to each end of the kingpin 5A. Mounted eccentrically on each wheel-mounting bracket 21 is a wheel mount 19 for mounting the pair of wheels 18. Due to the eccentricity of the mount, the wheels 18 are in a deployed position when the frame 12 is moved intothe deploy position toward the front end 1A of the ski 1 and are in a retracted position when the frame 12 is moved toward the rear end 1B of the ski 1. As shown in FIG. 5, the yoke 14 is positioned behind the stop plate 17, with reference to the front end of therunner 1, and the wheel unit 20 is in a retracted position. As can be seen, the lowest pointof each wheel 18 is raised above the gliding surface G of the ski 1.

Figure 6:
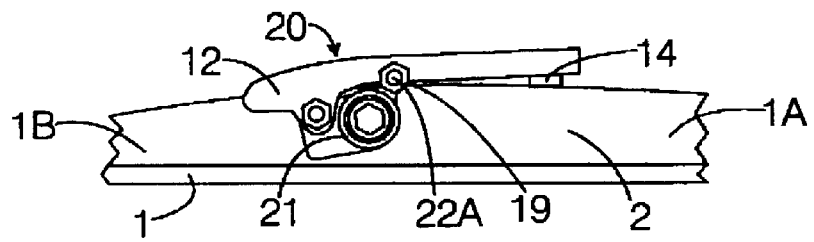
FIG. 6 shows in detail the wheel mount on the modified kingpin according to the invention.

FIG. 6 shows in greater detail the wheel-mounting bracket 21 and the movable frame 12 according to the invention. The wheel-mounting bracket 21 is rigidly and fixedly attached to a boss at each end of the kingpin 5A. Extending eccentrically from the wheel-mounting bracket 21 is a wheel mount 19. The wheels 18 are attached by means of a bolt 22A to each sideof the ski 1 that is threaded into a threaded hole. The movable frame 12 is pivotably attached to the wheel-mounting bracket 21 as shown.

FIG. 4 shows a spring-biased embodiment of the wheel unit 20B, comprising a biasing spring 31. In this embodiment, the wheels are placed in the deployed position manually, as described above; they are moved to the retracted position simply by lifting the weight of the snowmobile from the wheels. When the weight is lifted from the wheels, the spring-biased yoke 14 is automatically pulled to the retracted position.

Figure 7:
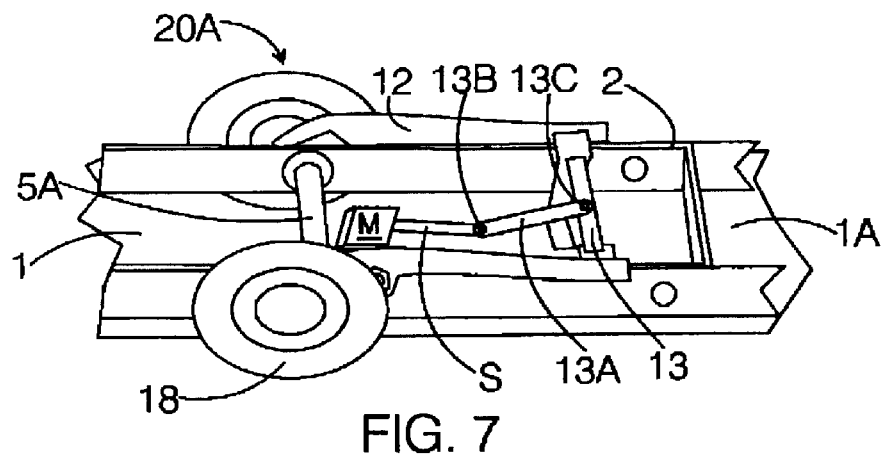
FIG. 7 is a perspective view of a motorized wheel unit according to the invention.

A Preferred Embodiment of a motorized wheel unit 20A is shown in FIG. 7. The components of the motorized wheel unit 20A that are identical to those of the wheel unit 20 have the same reference designation. Mounted on the bottom of the ski 1 is an electric motor M. The wiring for the motor is not shown herein, as it is well known in the art to connect electrical devices in vehicles. A shaft S is fixedly connected at one end to the motor M and pivotably linked at the other end to a first end 13B of a pivot arm 13A. A second end 13C of the pivot arm 13A is pivotably linked to the crossbar 13 of the frame 12. When an actuation means 43 for the motor M is actuated, the shaft S is moved forward toward the front end 1A of the ski 1, causing the second end 13C of the pivot arm 13A to swing slightly up and in the direction toward the rear end 1B of the ski 1. Actuating the actuation means 43 while the shaft S is in an extended position will cause the motor to retract the shaft S, thereby causing the frame 12 to move forward to a deployed position. The description of this motor, shaft, and pivot arm is merely illustrative. Means of moving a rigid body back and forth are well known, and it is intended that the scope of this invention not be limited to a specific linkage or actuating means.

Figure 8:
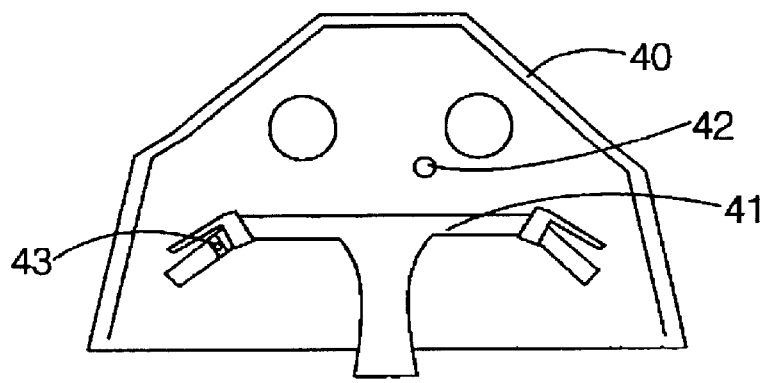
FIG. 8 is a partial view of a dashboard of a snowmobile, illustrating the thumb switch to actuate the wheel unit according to the invention, and an indicator light to indicate that the wheels are deployed.

FIG. 8 shows a dashboard 40 of a snowmobile. The actuation means 43 for the motor M, which can be a thumb switch, a toggle switch, a button switch, for example, is shown mounted on the handlebars 41 of the snowmobile. An indicator light 42, shown here as mounted on the dashboard 40, indicates a deployed condition of the wheel unit.

Although the invention has been described by reference to several embodiments mentioned herein, they are merely illustrative of the present invention. It should be understood that variations in construction of the present invention may be contemplated in view of the following claims, without straying from the intended scope and field of the invention herein disclosed.

What is claimed is:

1. A wheel kit for adapting a conventional ski from a ski-supported vehicle to a wheeled unit, wherein said ski has a gliding surface, an inner bottom surface, sidewalls that extend upward from said inner bottom surface, and kingpin mounting holes in said side walls for receiving a kingpin that links said ski to said ski-supported vehicle, said kit comprising:

a modified kingpin having two ends;
a frame;
a wheel-mounting bracket; and
a wheel,
wherein said modified kingpin is adapted to receive said wheel-mounting bracket and is mountable in said kingpin mounting holes and said wheel-mounting bracket is fixedly mountable on an end of said modified kingpin,
wherein said frame is pivotably attached to said wheel-mounting bracket and said wheel is eccentrically mounted on said wheel-mounting bracket, and
wherein said wheel-mounting bracket is rotatable into a wheel-deployed position and a wheel-retracted position.

2. The kit of claim 1 further comprising an automated drive means, a drive train, an actuating mechanism for actuating said drive means to move said frame to a deployed position and to a retracted position, and a switch, wherein said actuating mechanism is electrically connected to said drive means and is actuated by said switch.

3. The kit of the claim 2 further comprising a wheel-unit indicator that indicates said deployed position of said wheels.

4. The kit of claim 2, wherein said automated drive means is an electric motor and said drive train includes a shaft and a pivot arm that is pivotably linked to said shaft and to said frame.

5. The kit of claims 1, wherein said ski-supported vehicle is a snowmobile.

6. A wheel unit for use with a ski-mounted vehicle having a ski with a gliding surface, an inner bottom surface, side walls that extend upward from said inner bottom surface, and kingpin mounting holes for receiving a kingpin that links said ski with said ski-mounted vehicle, said wheel unit comprising:

a kingpin, receivable in said kingpin mounting holes,
a wheel mountable on said kingpin, and
a wheel-deployment means for rapid and easy deployment and retraction of said wheel,
wherein said kingpin is adapted to receive said wheel and said wheel-deployment means,
wherein said wheel-deployment means has a first end that is rotatably mountable on said kingpin such that said wheel is movable from a retracted-wheel position into a deployed-wheel position and from a deployed-wheel position into a retracted-wheel position, and
wherein, when said wheel-deployment means is rotated into said deployed wheel position, said gliding surface of said ski is raised above a lowermost rolling surface of said wheel, and, when said wheel-deployment means is rotated into said retracted-wheel position, said lowermost rolling surface of said wheel is raised above said gliding surface.

7. The wheel unit according to claim 6, wherein said wheel-deployment means comprises:

a deployment frame, and
a wheel-mounting bracket,
wherein said wheel is mounted on said wheel-mounting bracket,
wherein said kingpin is a modified kingpin that has at least one modified end that protrudes outward of said ski at at least one of said kingpin mounting holes and on which said wheel-mounting bracket is mountable,
wherein said deployment frame includes two side arms that extend along an outside of said side walls from said first end of said deployment frame to said second end, and wherein a crossbar spans said ski and connects said two side arms at said second end, and wherein at least one of said side arms is connected to a respective one said wheel-mounting bracket.

8. The wheel unit according to claim 7 further comprising a latching mechanism having a deployed-wheel latch position and a retracted-wheel latch position, said latching mechanism being mountable on said inner bottom surface of said ski and wherein said second end of said wheel-deployment means is receivable and latchable in said latching mechanism.

9. The wheel unit according to claim 7 further comprising a biasing spring mountable on said inner bottom surface of said ski and connected to said deployment frame, wherein said wheel-deployment means is spring biased to a retracted position and whereupon, when said wheel is in said deployed position and said ski-mounted vehicle is lifted so as to remove the weight of said vehicle from said wheel, said wheel is forced by said biasing spring to a retracted position.

10. The wheel unit according to claim 7, wherein said wheel-deployment means is automated, said wheel-deployment means including a drive means, a drive train to said deployment frame, and an actuating mechanism, and wherein said drive means is mountable in said inner bottom surface of said ski and said drive train is connectable between said drive means and said deployment frame.

11. The wheel unit according to claim 10 wherein said ski-mounted vehicle has a steering means, and wherein said actuating mechanism includes a switch mountable on said steering means of said vehicle and electrically connected to said drive means.

12. The wheel unit according to claim 10 wherein said drive means is an electric motor and said drive train includes a shaft connected to said motor and a linkage connected between said shaft and said crossbar.

13. The wheel unit according to claim 6 further comprising a wheel-unit indicator that indicates said deployed position of said wheels, wherein said ski-mounted vehicle has a dashboard and said indicator is mountable on said dashboard and connected to said wheel unit.

14. The wheel unit according to claim 6, wherein said wheel includes a pair of wheels and said wheel-mounting bracket includes a pair of wheel-mounting brackets, and wherein said modified kingpin has two ends, each end of which is modified to extend outward from said ski through a corresponding one of said kingpin mounting holes and is adapted to receive one bracket of said pair of wheel-mounting brackets and one wheel of said pair of wheels.

15. The wheel unit according to claim 7, where said wheel is mounted eccentrically on said wheel-mounting bracket.

16. A ski for use with a ski-mounted power vehicle, said ski comprising:

a gliding surface, an inner bottom ski surface, ski side walls that extend upward from said inner bottom surface, a kingpin for linking said ski to said ski-mounted power vehicle, a wheel mounted on said kingpin, a wheel-deployment means rotatably mounted on said kingpin, and a securing mechanism mounted on said ski and connectable to said wheel-deployment means, wherein said wheel-deployment means is rotatable into a deployment position in which a lowermost rolling surface of said wheel is lower than said gliding surface of said ski, and rotatable into a retraction position in which said lowermost rolling surface of said wheel is raised above said gliding surface of said ski, and wherein said wheel-deployment means is securable in said deployment position and in said retraction position by said securing mechanism.

17. The ski according to claim 16, wherein said wheel is mounted eccentrically on said kingpin.

* * * * *